(12) United States Patent
Cheng et al.

(10) Patent No.: US 9,104,213 B2
(45) Date of Patent: *Aug. 11, 2015

(54) INTEGRATED CIRCUIT WITH MULTI-FUNCTIONAL PARAMETER SETTING AND MULTI-FUNCTIONAL PARAMETER SETTING METHOD THEREOF

(71) Applicant: uPI Semiconductor Corp., Hsinchu County (TW)

(72) Inventors: Hung-Hsuan Cheng, Hsinchu County (TW); Wei-Ling Chen, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 237 days.

This patent is subject to a terminal disclaimer.

(21) Appl. No.: 13/798,147

(22) Filed: Mar. 13, 2013

(65) Prior Publication Data

US 2014/0218004 A1    Aug. 7, 2014

(30) Foreign Application Priority Data

Feb. 5, 2013  (TW) .............................. 102104456 A

(51) Int. Cl.
*G05F 3/02*    (2006.01)
*G06F 1/22*    (2006.01)

(52) U.S. Cl.
CPC ... *G05F 3/02* (2013.01); *G06F 1/22* (2013.01)

(58) Field of Classification Search
CPC .................................... G05F 3/02; G06F 1/22

USPC ........................................... 323/318; 713/100
See application file for complete search history.

(56) References Cited

U.S. PATENT DOCUMENTS

| 7,098,632 | B2 | 8/2006 | Chen et al. |
| 7,233,131 | B2 | 6/2007 | Lin et al. |
| 7,253,997 | B2 | 8/2007 | Balakrishnan et al. |
| 7,504,783 | B2 | 3/2009 | Zarr |
| 7,928,787 | B2 | 4/2011 | Mehas et al. |
| 7,986,137 | B2 | 7/2011 | Laur et al. |
| 8,222,876 | B2 | 7/2012 | Wang |
| 2011/0043114 | A1 | 2/2011 | Hsu et al. |
| 2012/0074845 | A1 | 3/2012 | Aoki et al. |

*Primary Examiner* — Albert Wang
(74) *Attorney, Agent, or Firm* — Jianq Chyun IP Office

(57) ABSTRACT

An integrated circuit with multi-functional parameter setting and a multi-functional parameter setting method thereof are provided. The multi-functional parameter setting method includes the following steps: providing the integrated circuit, wherein the integrated circuit includes a multi-functional pin and a switch unit, wherein the multi-functional pin is coupled to an external setting unit, and the switch unit includes an operational amplifier; sensing a programmable reference voltage of the external setting unit through one operation of the switch unit and executing a first function setting according to the programmable reference voltage; and sensing a programmable reference current related to the external setting unit through another operation of the switch unit and executing a second function setting according to the programmable reference current, wherein a value of the programmable reference current is related to the programmable reference voltage.

13 Claims, 5 Drawing Sheets

INTEGRATED CIRCUIT WITH MULTI-FUNCTIONAL PARAMETER SETTING AND MULTI-FUNCTIONAL PARAMETER SETTING METHOD THEREOF

CROSS-REFERENCE TO RELATED APPLICATION

This application claims the priority benefit of Taiwan application serial no. 102104456, filed on Feb. 5, 2013. The entirety of the above-mentioned patent application is hereby incorporated by reference herein and made a part of this specification.

BACKGROUND OF THE INVENTION

1. Field of the Invention

The invention is related to a power management integrated circuit, and more particularly, to an integrated circuit with multi-functional parameter setting and a multi-functional parameter setting method thereof.

2. Description of Related Art

In a computer system, a voltage identification definition (VID) generated by a central processing unit (CPU) varies with its working mode to dynamically adjust its working voltage (or core voltage) for saving power consumption. When the computer system does not require a huge amount of operational power consumption, the CPU provides the VID to a voltage regulator according to the working mode of the CPU. After that, the voltage regulator lowers the working voltage of the CPU according to the VID.

A conventional integrated circuit (IC) for voltage adjustment generally has additional functions, for example, a droop function for sensing if there is a droop current. When the IC with additional functions performs a voltage adjustment, the IC normally requires other pins, and also quite many additional setting elements so as to adjust the working voltage of the CPU. However, this may increase not only a whole area of the IC but also manufacturing cost.

With advances in electronic technologies, more and more functions are included in the IC. As there are limitations on the number of pins of the IC, some ICs are incapable of increasing other function settings by their limited numbers of pins.

SUMMARY OF THE INVENTION

In view of the above, the invention proposes an integrated circuit with multi-functional parameter setting and a multi-functional parameter setting method thereof for solving the aforementioned problems of the prior art.

The invention proposes an integrated circuit with multi-functional parameter setting. The integrated circuit is coupled to an external setting unit. The integrated circuit includes a multi-functional pin, a first function adjustment circuit, a second function adjustment circuit and a switch unit. The multi-functional pin is coupled to the external setting unit. The switch unit includes an operational amplifier and is coupled to the multi-functional pin, the first function adjustment circuit and the second function adjustment circuit. The first function adjustment circuit senses a programmable reference voltage of the external setting unit through one operation of the switch unit. The second function adjustment circuit senses a programmable reference current related to the external setting unit through another operation of the switch unit. A value of the programmable reference current is related to the programmable reference voltage.

In an exemplary embodiment of the invention, the switch unit further includes a first group switch and a second group switch. A control terminal of the first group switch is controlled by a first control signal. A control terminal of the second group switch is controlled by a second control signal. The first group switch and the second group switch are not turned on in the same period of time. The first group switch includes a first to a third switches. A first terminal of the first switch is coupled to a first reference voltage. A second terminal of the first switch is coupled to a first input terminal of the operational amplifier. A first terminal of the second switch is coupled to an output terminal and a second input terminal of the operational amplifier. A second terminal of the second switch is coupled to the multi-functional pin. A first terminal of the third switch is coupled to the first function adjustment circuit. A second terminal of the third switch is coupled to a power terminal of the operational amplifier. The second group switch includes a plurality of switches.

In an exemplary embodiment of the invention, the second group switch includes a fourth and a fifth switches. A first terminal of the fourth switch is coupled to the second function adjustment circuit. A second terminal of the fourth switch is coupled to the second input terminal and the output terminal of the operational amplifier. A first terminal of the fifth switch is coupled to the first input terminal of the operational amplifier. A second terminal of the fifth switch is coupled to the multi-functional pin.

In an exemplary embodiment of the invention, the external setting unit includes a resistor network. The resistor network receives a second reference voltage and provides the programmable reference voltage to the multi-functional pin.

In an exemplary embodiment of the invention, the external setting unit further includes an external setting circuit connected to the control terminal of the first group switch and the control terminal of the second group switch.

In an exemplary embodiment of the invention, the integrated circuit further includes a logic circuit configured to generate the first control signal and the second control signal.

In an exemplary embodiment of the invention, the integrated circuit further includes an external setting pin coupled to the control terminal of the first group switch and the control terminal of the second group switch. The external setting pin receives an external control signal including the first control signal and the second control signal.

In an exemplary embodiment of the invention, the first function adjustment circuit includes a first current mirror, a first current-sensing circuit and a first function setting circuit. The first current-sensing circuit is coupled to the first current mirror. The first current-sensing circuit is configured to sense a transfer current and perform a current comparison to generate a first parameter signal. The first function setting circuit is coupled to the first current-sensing circuit. The first function setting circuit is configured to receive the first parameter signal and execute a first function setting in response to the first parameter signal.

In an exemplary embodiment of the invention, the first current-sensing circuit includes a current-comparing circuit. The current-comparing circuit has a plurality of predetermined current sources. The current-comparing circuit performs a current comparison between the transfer current and the plurality of predetermined current sources to generate the first parameter signal and to output the first parameter signal to the first function setting circuit.

In an exemplary embodiment of the invention, the second function adjustment circuit includes a second current-sensing circuit and a second function setting circuit. The second current-sensing circuit is coupled to the switch unit and is configured to sense the programmable reference current to generate a second parameter signal. The second function setting circuit is configured to receive the second parameter signal and execute a second function setting in response to the second parameter signal.

In an exemplary embodiment of the invention, the second function adjustment circuit further includes a second current mirror, a first resistor, an n-type metal oxide semiconductor field effect transistor and a first comparator. A first terminal of the second current mirror is coupled to a first working voltage. A first terminal of the first resistor is coupled to the switch unit. A drain of the n-type metal oxide semiconductor field effect transistor is coupled to a second terminal of the second current mirror. A source of the n-type metal oxide semiconductor field effect transistor is coupled to a second terminal of the first resistor. A first input terminal of the first comparator receives a first threshold voltage. A second input terminal of the first comparator is coupled to the source of the n-type metal oxide semiconductor field effect transistor and the second terminal of the first resistor. An output terminal of the first comparator is coupled to a gate of the n-type metal oxide semiconductor field effect transistor.

In an exemplary embodiment of the invention, the second function adjustment circuit further includes a third current mirror, a second resistor, a p-type metal oxide semiconductor field effect transistor and a second comparator. A second terminal of the third current mirror is coupled to a second working voltage. A first terminal of the second resistor is coupled to the switch unit. A drain of the p-type metal oxide semiconductor field effect transistor is coupled to a first terminal of the third current mirror. A source of the p-type metal oxide semiconductor field effect transistor is coupled to a second terminal of the second resistor. A first input terminal of the second comparator receives a second threshold voltage. A second input terminal of the second comparator is coupled to the source of the p-type metal oxide semiconductor field effect transistor and the second terminal of the second resistor. An output terminal of the second comparator is coupled to a gate of the p-type metal oxide semiconductor field effect transistor.

The invention further proposes a multi-functional parameter setting method including the following steps. An integrated circuit including a multi-functional pin and a switch unit is provided, wherein the multi-functional pin is coupled to an external setting unit, and the switch unit includes an operational amplifier. A programmable reference voltage of the external setting unit is sensed through one operation of the switch unit, and a first function setting is executed according to the programmable reference voltage. A programmable reference current related to the external setting unit is sensed through another operation of the switch unit, and a second function setting is executed according to the programmable reference current, wherein a value of the programmable reference current is related to the programmable reference voltage.

Based on the above, the integrated circuit and the multi-functional parameter setting method of the invention make it possible that multiple function settings are achieved by the same multi-functional pin, and the problem of increased area of the integrated circuit is effectively avoided. On the other hand, compared to conventional methods, the integrated circuit of the invention occupies a smaller circuit area. Thus the manufacturing cost is decreased.

It should be understood that the above general descriptions and following embodiments are only for explanation and presented as examples, but not intended to limit the scope of the invention.

BRIEF DESCRIPTION OF THE DRAWINGS

The accompanying drawings constitute a part of this specification. The drawings illustrate embodiments of the invention and, together with the description, serve to explain the principles of the invention.

DESCRIPTION OF THE EMBODIMENTS

Figure 1:
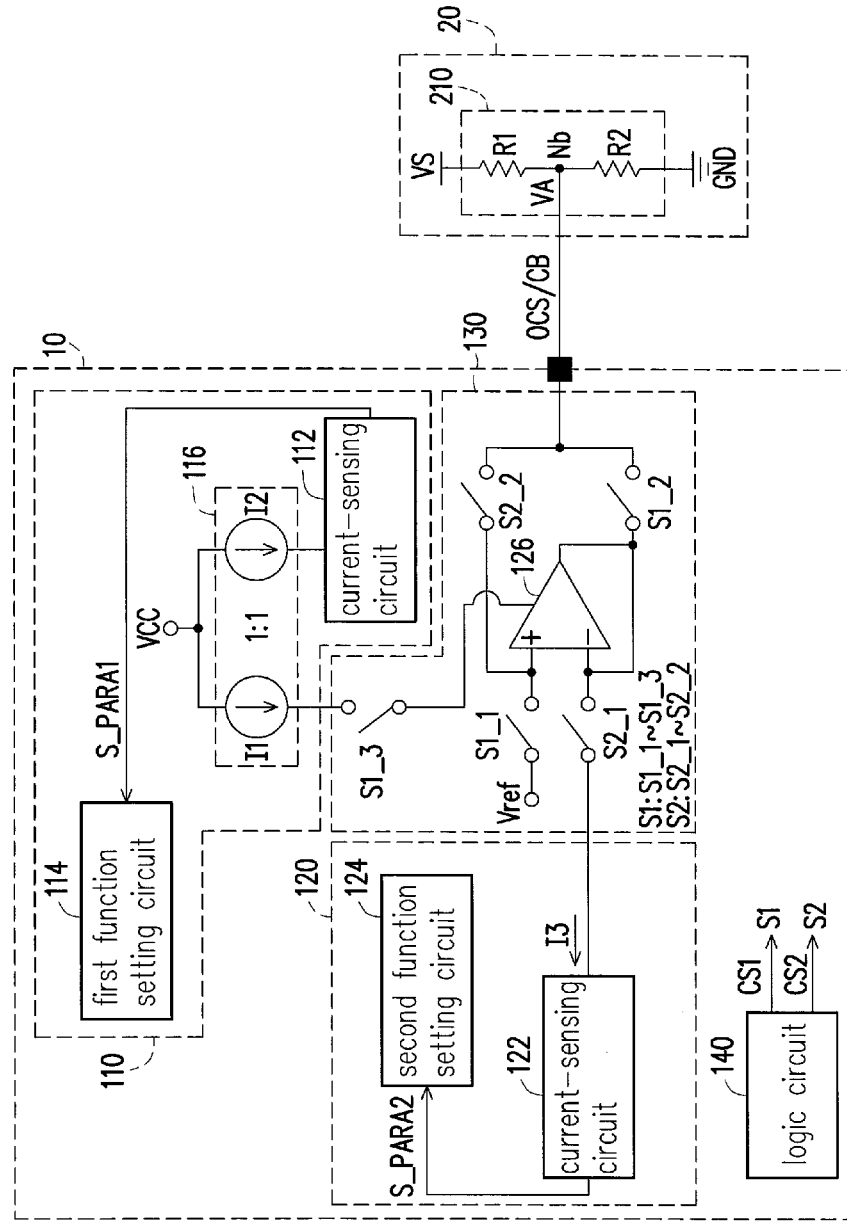
FIG. 1 is a schematic diagram of an integrated circuit with multi-functional parameter setting according to an embodiment of the invention.

Reference will now be made in detail to the exemplary embodiments of the invention, examples of which are illustrated in the accompanying drawings. Moreover, elements/components with the same or similar reference numerals represent the same or similar parts in the drawings and embodiments.

FIG. 1 is a schematic diagram of an integrated circuit (IC) with multi-functional parameter setting according to an embodiment of the invention. Please refer to FIG. 1. The integrated circuit 10 includes a multi-functional pin OCS/CB, a first function adjustment circuit 110, a second function adjustment circuit 120 and a switch unit 130.

The multi-functional pin OCS/CB is coupled to an external setting unit 20. The switch unit 130 includes an operational amplifier 126 and is coupled to the multi-functional pin OCS/CB, the first function adjustment circuit 110 and the second function adjustment circuit 120. The first function adjustment circuit 110 senses a programmable reference voltage VA of the external setting unit 20 through one operation of the switch unit 130, and the second function adjustment circuit 120 senses a programmable reference current I3 related to the external setting unit 20 through another operation of the switch unit 130.

In the present exemplary embodiment, the switch unit 130 includes the operational amplifier 126, a first group switch S1 and a second group switch S2. A control terminal of the first group switch S1 is controlled by a first control signal CS1. A control terminal of the second group switch S2 is controlled by a second control signal CS2. The first group switch S1 and the second group switch S2 are not turned on in the same period of time.

The first group switch S1 includes a first switch S1_1, a second switch S1_2 and a third switch S1_3. A first terminal of the first switch S1_1 is coupled to a reference voltage Vref. A second terminal of the first switch S1_1 is coupled to a non-inverting input terminal of the operational amplifier 126. A first terminal of the second switch S1_2 is coupled to an output terminal and an inverting input terminal of the operational amplifier 126. A second terminal of the second switch S1_2 is coupled to the multi-functional pin OCS/CB. A first terminal of the third switch S1_3 is coupled to the first function adjustment circuit 110. A second terminal of the third switch S1_3 is coupled to a power terminal of the operational amplifier 126.

The second group switch S2 includes a fourth switch S2_1 and a fifth switch S2_2. A first terminal of the fourth switch S2_1 is coupled to the second function adjustment circuit 120. A second terminal of the fourth switch S2_1 is coupled to the inverting input terminal and the output terminal of the operational amplifier 126. A first terminal of the fifth switch S2_2 is coupled to the non-inverting input terminal of the operational amplifier 126. A second terminal of the fifth switch S2_2 is coupled to the multi-functional pin OCS/CB.

The external setting unit 20 exists outside the integrated circuit 10. The external setting unit 20 includes a resistor network 210 coupled to a reference voltage VS and a grounding end GND. The resistor network 210 has a node Nb to provide the programmable reference voltage VA to the multi-functional pin OCS/CB. In the present embodiment, although the resistor network 210 consists of a resistor R1 connected in series with a resistor R2, the resistor network 210 may also be connected to a capacitor or other elements in series or in parallel to form an impedance. The resistor network 210 of the present embodiment is not limited to the aforementioned forms and is variable.

Figure 2:
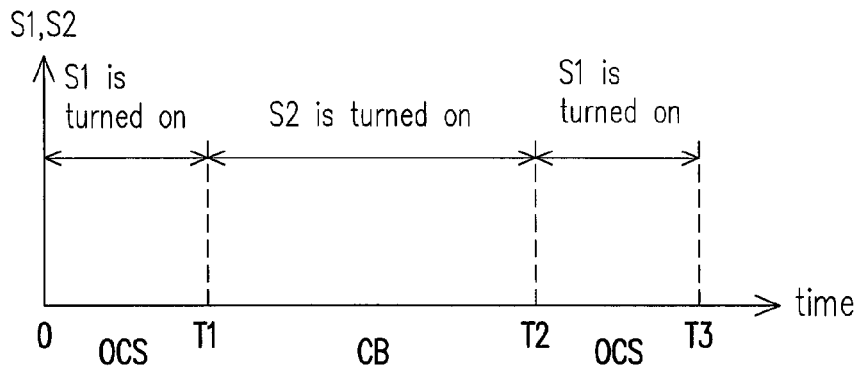
FIG. 2 and FIG. 3 are timing diagrams of operations of a first group switch and a second group switch in FIG. 1.
Figure 3:
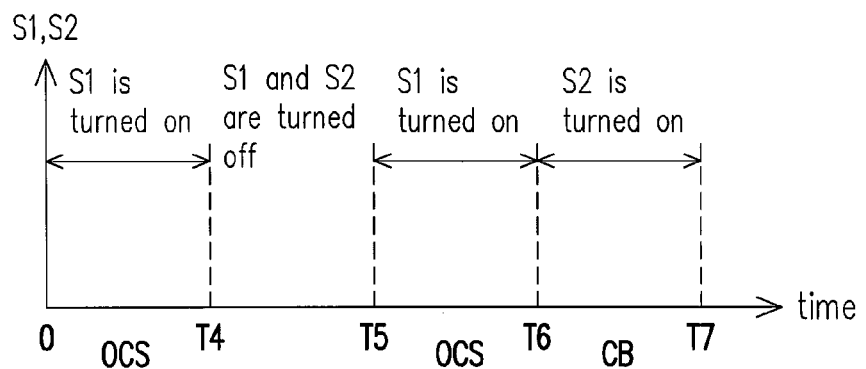

FIG. 2 and FIG. 3 are timing diagrams of operations of the first group switch S1 and the second group switch S2 in FIG. 1, wherein T1 to T7 each represent different times. In the same period of time, the first group switch S1 and the second group switch S2 are not turned on at the same time, thereby enabling one of the first function adjustment circuit 110 and the second function adjustment circuit 120 to execute a function setting. In addition, in the same period of time, the first group switch S1 and the second group switch S2 may both be turned off. In other words, in different periods of time, only either the first function adjustment circuit 110 or the second function adjustment circuit 120 is allowed to operate.

For instance, in the period of time T1~T2, only the second group switch S2 is turned on and the integrated circuit 10 executes a current balance (CB) function setting; in the period of time T4~T5, both the first group switch S1 and the second group switch S2 are turned off and the integrated circuit 10 does not execute any function setting; in the period of time T5~T6, only the first group switch S1 is turned on and the integrated circuit 10 executes an over current setting (OCS). Based on the above, it may be inferred from the drawings the manners in which persons skilled in the art perform function settings with respect to other times, and therefore the descriptions are omitted.

The detailed circuits of the first function adjustment circuit 110 and the second function adjustment circuit 120 as shown in FIG. 1 are described as follows. Please again refer to FIG. 1. The integrated circuit 10 may have two adjustment mechanisms.

The first function adjustment circuit 110 includes a current-sensing circuit 112, a first function setting circuit 114 and a first current mirror 116. The current-sensing circuit 112 is coupled between the first current mirror 116 and the first function setting circuit 114. The current-sensing circuit 112 is configured to sense a proportional current I2 and perform a current comparison to generate a first parameter signal S_PARA1. In the first current mirror 116, a ratio of the proportional current I2 to a transfer current I1 can be 1:1. Thus it may be said that the current-sensing circuit 112 is configured to perform a current comparison to the transfer current I1. The first function setting circuit 114 receives the first parameter signal S_PARA1 and executes a first function setting in response to the first parameter signal S_PARA1.

The second function adjustment circuit 120 includes a current-sensing circuit 122 and a second function setting circuit 124. The current-sensing circuit 122 is coupled to the switch unit 130 and is configured to sense the programmable reference current I3 to generate a second parameter signal S_PARA2. The second function setting circuit 124 receives the second parameter signal S_PARA2 and executes a second function setting in response to the second parameter signal S_PARA2.

It should be noted that in different periods of time, the first parameter signal S_PARA1 and the second parameter signal S_PARA2 are transmitted respectively to the first function setting circuit 114 and the second function setting circuit 124. The form of the first/second function setting circuit can be configured to function as an analog/digital converter or to perform functions of current balance and output voltage excursion or droop. Therefore, the integrated circuit 10 accomplishes multiple function settings by the same multi-functional pin OCS/CB.

In addition, the integrated circuit 10 further includes a logic circuit 140. The logic circuit 140 is configured to generate the first control signal CS1 and the second control signal CS2, thereby controlling the conduction conditions of the first group switch S1 and the second group switch S2, respectively. The invention does not limit the detailed structure of the logic circuit 140.

Figure 4:
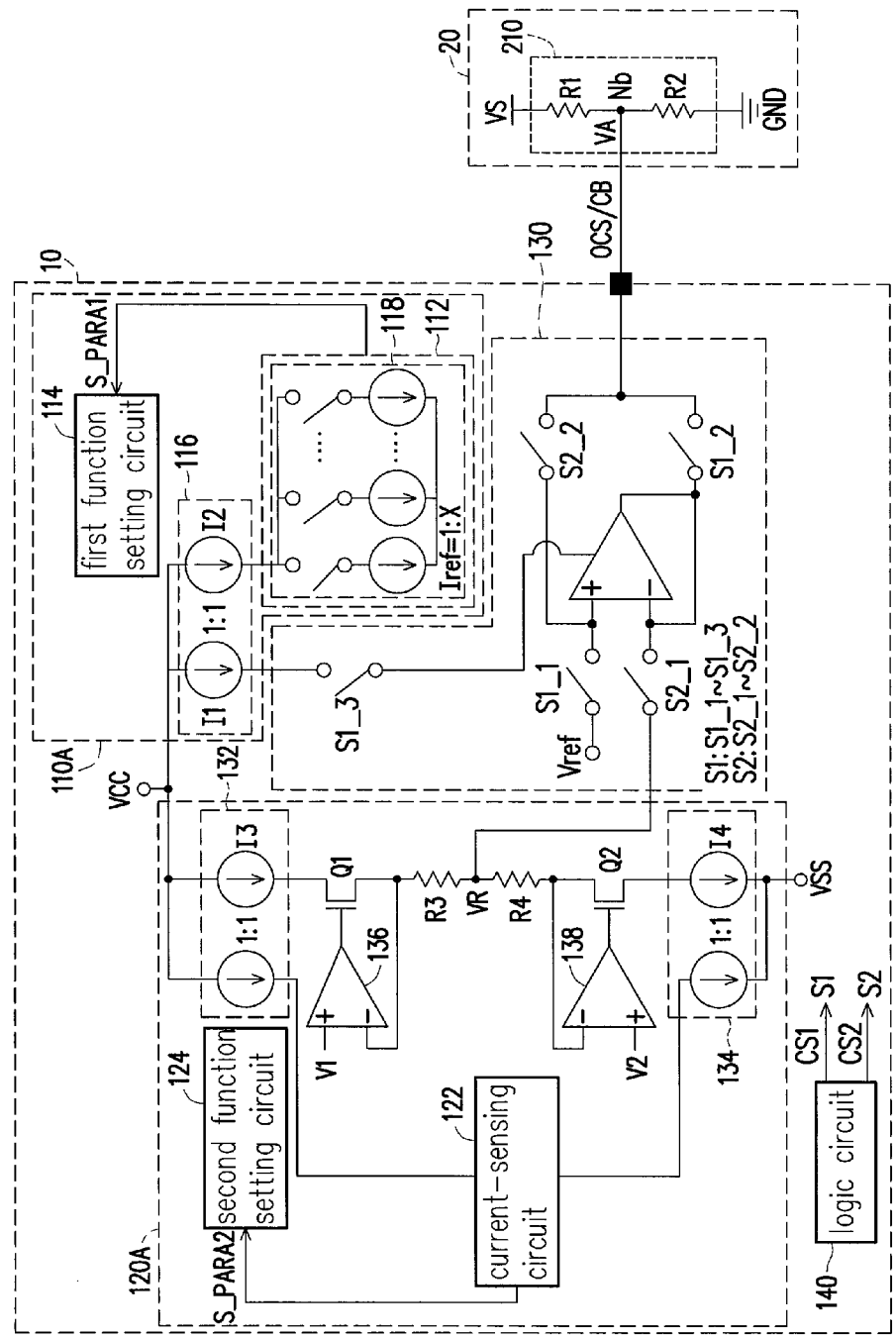
FIG. 4 is a schematic diagram of an integrated circuit with multi-functional parameter setting according to another embodiment of the invention.

FIG. 4 is a schematic diagram of an integrated circuit with multi-functional parameter setting according to another embodiment of the invention. Please refer to FIG. 4. FIG. 4 illustrates another embodiment based on the structure shown in FIG. 1. FIG. 4 differs from FIG. 1 in a first function adjustment circuit 110A and a second function adjustment circuit 120A.

In the first function adjustment circuit 110A, the current-sensing circuit 112 includes a current-comparing circuit 118. The current-comparing circuit 118 has a plurality of predetermined current sources. The current-comparing circuit 118 performs a current comparison between the proportional current I2 and predetermined current sources Iref. In the first current mirror 116, a ratio of the transfer current I1 to the proportional current I2 can be 1:1, but is not limited thereto. There are 1 to X current sources in the predetermined current sources Iref in a total of X levels. The current-comparing circuit 118 performs an analog-to-digital conversion of the proportional current I2 to obtain the first parameter signal S_PARA1 in a digital format. This first parameter signal S_PARA1 represents a Y-th level setting value among the X levels. Furthermore, the current-comparing circuit 118 outputs the first parameter signal S_PARA1 to the first function setting circuit 114.

The second function adjustment circuit 120A further includes a second current mirror 132, an n-type metal oxide semiconductor field effect transistor Q1, a first comparator 136, a third current mirror 134, a p-type metal oxide semiconductor field effect transistor Q2, a second comparator 138, and resistors R3 and R4. A first terminal of the second current mirror 132 is coupled to a first working voltage VCC. A first terminal of the resistor R3 is coupled to the switch unit 130. A drain of the n-type metal oxide semiconductor field effect transistor Q1 is coupled to a second terminal of the second current mirror 132. A source of the n-type metal oxide semiconductor field effect transistor Q1 is coupled to a second terminal of the resistor R3. A non-inverting input terminal of the first comparator 136 receives a first threshold voltage V1. An inverting input terminal of the first comparator 136 is coupled to the source of the n-type metal oxide semiconductor field effect transistor Q1 and the second terminal of the resistor R3. An output terminal of the first comparator 136 is coupled to a gate of the n-type metal oxide semiconductor field effect transistor Q1.

A second terminal of the third current mirror 134 is coupled to a second working voltage VSS. A first terminal of the resistor R4 is coupled to the switch unit 130. A drain of the p-type metal oxide semiconductor field effect transistor Q2 is coupled to a first terminal of the third current mirror 134. A source of the p-type metal oxide semiconductor field effect transistor Q2 is coupled to a second terminal of the resistor R4. A non-inverting input terminal of the second comparator 138 receives a second threshold voltage V2. An inverting input terminal of the second comparator 138 is coupled to the source of the p-type metal oxide semiconductor field effect transistor Q2 and the second terminal of the resistor R4. An output terminal of the second comparator 138 is coupled to a gate of the p-type metal oxide semiconductor field effect transistor Q2.

When the first group switch S1 is turned on but the second group switch S2 is turned off, the switch unit 130 forms a buffer for voltage-to-current conversion. Furthermore, when the reference voltage Vref equals the reference voltage VS, the programmable reference voltage VA located at the multi-functional pin OCS/CB is represented by Equation 1 as below.

$$VA = V_{OCS/CB(S1\_ON)} = Vref = VS \quad \text{(Equation 1)}.$$

It is known from Equation 1 and FIG. 4 that there is no voltage difference between two terminals of the resistor R1. At this moment, the transfer current I1=Vref/R2. Thus the function setting of the first function setting circuit 114 is determined by adjusting the value of the resistor R2 of the resistor network 210.

When the first group switch S1 is turned off but the second group switch S2 is turned on, the switch unit 130 forms a voltage buffer. The programmable reference voltage VA located at the multi-functional pin OCS/CB, the currents I3 and I4 are represented by, respectively, Equation 2 to Equation 4 as below.

$$VA = VR = V_{OCS/CB(S2\_ON)} = VS \times \frac{R2}{R1 + R2}; \quad \text{(Equation 2)}$$

$$I3 = (V1 - VR)/R3; \quad \text{(Equation 3)}$$

$$I4 = (VR - V2)/R4. \quad \text{(Equation 4)}$$

It is known from Equation 2 to Equation 4 that the programmable reference voltage VA is determined by adjusting the value of the resistor R1 or R2 of the resistor network 210. The voltage VR equals the programmable reference voltage VA. Furthermore, the value of the programmable reference current I3 or I4 is related to the programmable reference voltage VA. Therefore, the function setting of the second function setting circuit 124 is related to the programmable reference voltage VA, the first threshold voltage V1 and the second threshold voltage V2.

Figure 5:
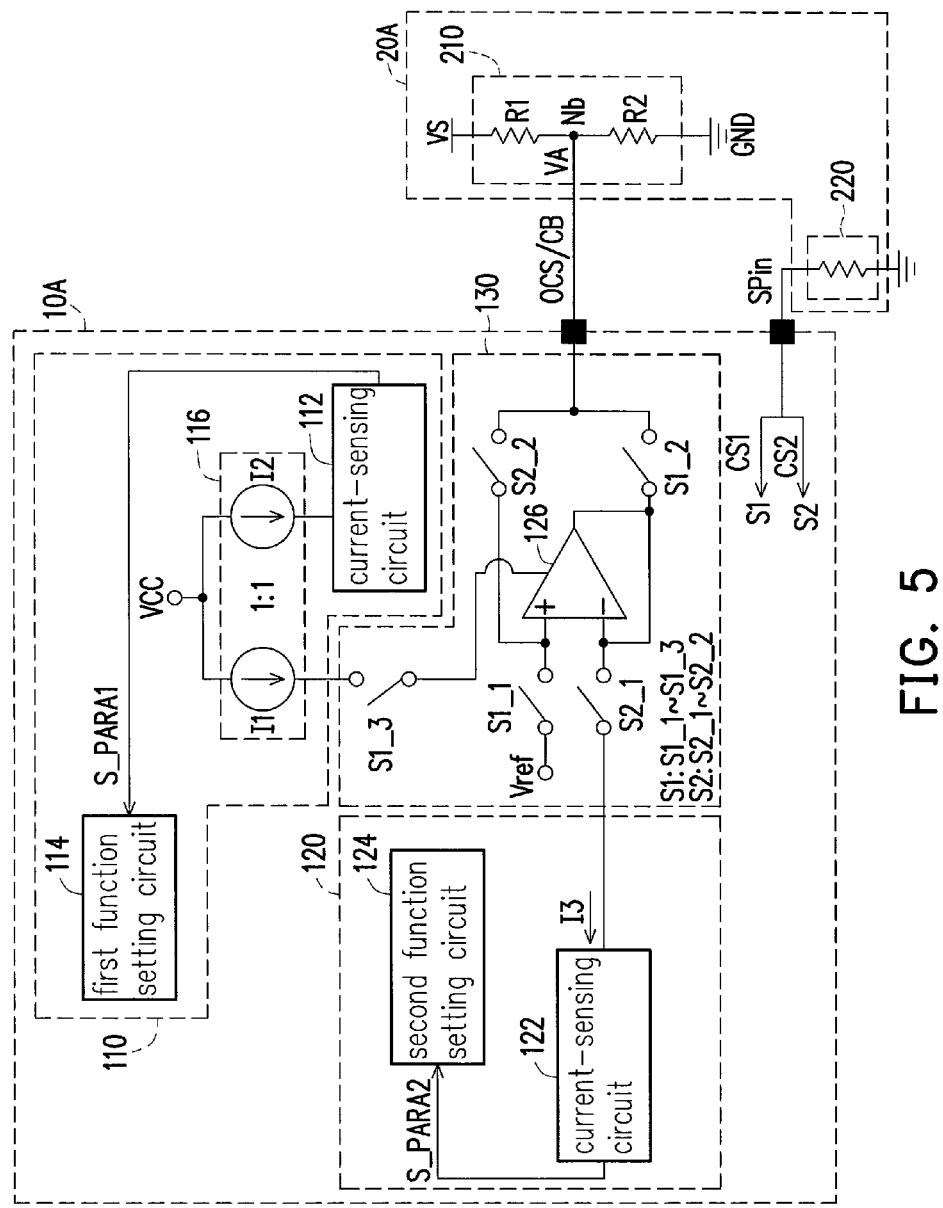
FIG. 5 is a schematic diagram of an integrated circuit with multi-functional parameter setting according to another embodiment of the invention.

FIG. 5 is a schematic diagram of an integrated circuit with multi-functional parameter setting according to another embodiment of the invention. Please refer to FIG. 5. FIG. 5 illustrates another embodiment based on the structure shown in FIG. 1. FIG. 5 differs from FIG. 1 in that an integrated circuit 10A in FIG. 5 further includes an external setting pin SPin but excludes the logic circuit 140 as in FIG. 1. The external setting pin SPin is coupled to the control terminals of the first group switch S1 and the second group switch S2. The external setting pin SPin receives an external control signal including the first control signal CS1 and the second control signal CS2.

An external setting unit 20A includes the resistor network 210 and an external setting circuit 220. The external setting circuit 220 is connected to a control terminal of the switch unit 130. A user determines the conduction conditions of the first group switch S1 and the second group switch S2 by the external setting circuit 220. In the same period of time, the first group switch S1 and the second group switch are not turned on at the same time, but may both be turned off at the same time. Thus in different periods of time, the user enables one of the first function adjustment circuit 110 and the second function adjustment circuit 120 to execute a function setting.

Figure 6:
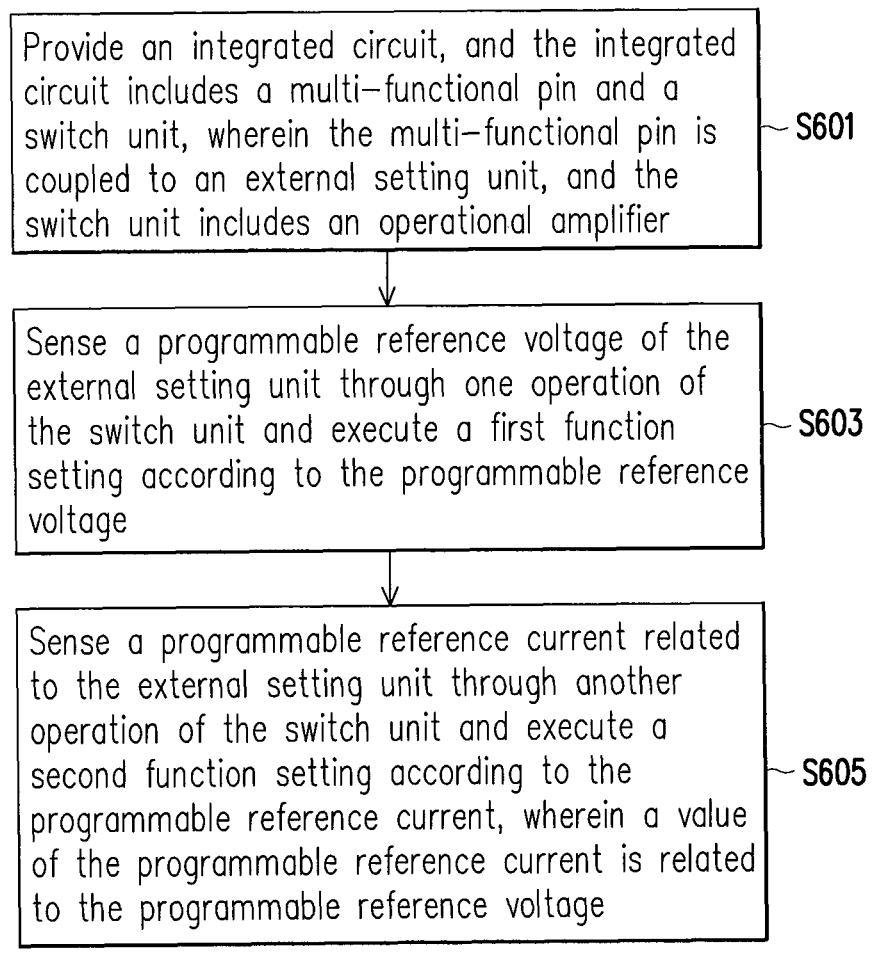
FIG. 6 is a flow chart illustrating a parameter setting method according to an embodiment of the invention.

Based on the descriptions disclosed in the embodiments aforementioned, a universal multi-functional parameter setting method is integrated herein. More specifically, FIG. 6 is a flow chart illustrating a parameter setting method according to an embodiment of the invention. Referring to FIG. 6 in combination with FIG. 1, the multi-functional parameter setting method of the present embodiment includes the following steps.

As shown in step S601, the integrated circuit 10 is provided. The integrated circuit 10 includes the multi-functional pin OCS/CB and the switch unit 130, wherein the multi-functional pin OCS/CB is coupled to the external setting unit 20, and the switch unit 130 includes the operational amplifier 126.

Next, as shown in step S603, the programmable reference voltage VA of the external setting unit 20 is sensed through one operation of the switch unit 130, and the first function setting is executed according to the programmable reference voltage VA.

Then, as shown in step S605, the programmable reference current I3 of the external setting unit 20 is sensed through another operation of the switch unit 130, and the second function setting is executed according to the programmable reference current I3.

In summary, the integrated circuit 10 and the multi-functional parameter setting method of the embodiments of the invention make it possible that multiple function settings are achieved by the same multi-functional pin OCS/CB, and the problem of increased area of the integrated circuit is effectively avoided. On the other hand, compared to conventional methods, the integrated circuit 10 occupies a smaller circuit area. Thus the manufacturing cost is decreased.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

In addition, any of the embodiments or any of the claims of the invention does not need to achieve all of the advantages or features disclosed by the invention. Moreover, the abstract and the title are merely used to aid in search of patent documents and are not intended to limit the scope of the claims of the invention.

What is claimed is:

1. An integrated circuit with multi-functional parameter setting coupled to an external setting unit, the integrated circuit comprising:
   a multi-functional pin coupled to the external setting unit;
   a first function adjustment circuit;
   a second function adjustment circuit; and
   a switch unit comprising an operational amplifier, the switch unit being coupled to the multi-functional pin, the first function adjustment circuit and the second function adjustment circuit, wherein the first function adjustment circuit senses a programmable reference voltage of the external setting unit through one operation of the switch unit, the second function adjustment circuit senses a programmable reference current related to the external setting unit through another operation of the switch unit, and a value of the programmable reference current is related to the programmable reference voltage.

2. The integrated circuit as claimed in claim 1, wherein the switch unit further comprises:
 a first group switch, with a control terminal controlled by a first control signal, the first group switch comprising:
  a first switch, with a first terminal coupled to a first reference voltage, and a second terminal coupled to a first input terminal of the operational amplifier;
  a second switch, with a first terminal coupled to an output terminal and a second input terminal of the operational amplifier, and a second terminal coupled to the multi-functional pin; and
  a third switch, with a first terminal coupled to the first function adjustment circuit, and a second terminal coupled to a power terminal of the operational amplifier; and
 a second group switch, with a control terminal controlled by a second control signal, the second group switch comprising a plurality of switches,
 wherein the first group switch and the second group switch are not turned on in the same period of time.

3. The integrated circuit as claimed in claim 2, wherein the second group switch comprises:
 a fourth switch, with a first terminal coupled to the second function adjustment circuit, and a second terminal coupled to the second input terminal and the output terminal of the operational amplifier; and
 a fifth switch, with a first terminal coupled to the first input terminal of the operational amplifier, and a second terminal coupled to the multi-functional pin.

4. The integrated circuit as claimed in claim 1, wherein the external setting unit comprises a resistor network, the resistor network receiving a second reference voltage and providing the programmable reference voltage to the multi-functional pin.

5. The integrated circuit as claimed in claim 1, wherein the external setting unit further comprises an external setting circuit connected to the control terminal of the first group switch and the control terminal of the second group switch.

6. The integrated circuit as claimed in claim 2, further comprising:
 a logic circuit configured to generate the first control signal and the second control signal.

7. The integrated circuit as claimed in claim 2, further comprising:
 an external setting pin coupled to the control terminal of the first group switch and the control terminal of the second group switch, the external setting pin receiving an external control signal comprising the first control signal and the second control signal.

8. The integrated circuit as claimed in claim 1, wherein the first function adjustment circuit comprises:
 a first current mirror;
 a first current-sensing circuit coupled to the first current mirror and configured to sense a transfer current and perform a current comparison to generate a first parameter signal; and
 a first function setting circuit coupled to the first current-sensing circuit and configured to receive the first parameter signal and execute a first function setting in response to the first parameter signal.

9. The integrated circuit as claimed in claim 8, wherein the first current-sensing circuit comprises:
 a current-comparing circuit having a plurality of predetermined current sources, the current-comparing circuit performing a current comparison between the transfer current and the plurality of predetermined current sources to generate the first parameter signal and to output the first parameter signal to the first function setting circuit.

10. The integrated circuit as claimed in claim 1, wherein the second function adjustment circuit comprises:
 a second current-sensing circuit coupled to the switch unit and configured to sense the programmable reference current to generate a second parameter signal; and
 a second function setting circuit configured to receive the second parameter signal and execute a second function setting in response to the second parameter signal.

11. The integrated circuit as claimed in claim 10, wherein the second function adjustment circuit further comprises:
 a second current mirror, with a first terminal coupled to a first working voltage;
 a first resistor, with a first terminal coupled to the switch unit;
 an n-type metal oxide semiconductor field effect transistor, with a drain coupled to a second terminal of the second current mirror and a source coupled to a second terminal of the first resistor;
 a first comparator, with a first input terminal receiving a first threshold voltage, a second input terminal coupled to the source of the n-type metal oxide semiconductor field effect transistor and the second terminal of the first resistor, and an output terminal coupled to a gate of the n-type metal oxide semiconductor field effect transistor.

12. The integrated circuit as claimed in claim 11, wherein the second function adjustment circuit further comprises:
 a third current mirror, with a second terminal coupled to a second working voltage;
 a second resistor, with a first terminal coupled to the switch unit;
 a p-type metal oxide semiconductor field effect transistor, with a drain coupled to a first terminal of the third current mirror and a source coupled to a second terminal of the second resistor; and
 a second comparator, with a first input terminal receiving a second threshold voltage, a second input terminal coupled to the source of the p-type metal oxide semiconductor field effect transistor and the second terminal of the second resistor, and an output terminal coupled to a gate of the p-type metal oxide semiconductor field effect transistor.

13. A multi-functional parameter setting method comprising:
 providing an integrated circuit, the integrated circuit comprising a multi-functional pin and a switch unit, wherein the multi-functional pin is coupled to an external setting unit, and the switch unit comprises an operational amplifier;
 sensing a programmable reference voltage of the external setting unit through one operation of the switch unit and executing a first function setting according to the programmable reference voltage; and
 sensing a programmable reference current related to the external setting unit through another operation of the switch unit and executing a second function setting according to the programmable reference current, wherein a value of the programmable reference current is related to the programmable reference voltage.

* * * * *